United States Patent Office 3,809,700
Patented May 7, 1974

---

3,809,700
CERTAIN 5,6-DIOXOPYRROLO[2,1-b]THIAZOLES
Henry Rapoport, Berkeley, Calif., assignor to The Regents of The University of California, Berkeley, Calif.
No Drawing. Original application June 22, 1970, Ser. No. 48,550, now Patent No. 3,714,156. Divided and this application Sept. 15, 1972, Ser. No. 289,382
Int. Cl. C07d 99/14
U.S. Cl. 260—306.7                  3 Claims

ABSTRACT OF THE DISCLOSURE

A process for preparing lactams, particularly 1-azabicyclo[4.2.0]octanes, 1-azabicyclo[3.2.0]heptanes, 4-thio-1-azabicyclo[3.2.0]heptanes and 5 - thia - 1 - azabicyclo [4.2.0]octenes, which comprises subjecting a cyclic α-keto amide to an oxidizing agent to form a carboxyl substituted lactam structure. The oxidant is preferably periodate, in an aqueous solution, at pH 5–9 and room temperature. The novel products obtained from the process are useful intermediates in the preparation of antimicrobial agents. The cyclic α-ketoamide starting materials are also novel.

---

This is a division of application Ser. No. 48,550 filed June 22, 1970, now U.S. Pat. No. 3,714,156.

The invention described herein was made in the course of, or under a grant from, the U.S. Public Health Service, Department of Health, Education and Welfare.

This invention relates to a chemical process for the preparation of lactams. In particular, the invention relates to a process for preparing 1-azabicyclo[4.2.0]octanes, 1-azabicyclo[3.2.0]heptanes, 4-thia-1-azabicyclo[3.2.0]heptanes and 5-thia-1-azabicyclo[4.2.0]octenes.

The invention also encompasses the novel compounds obtained by the present process as disclosed more fully hereinafter.

The novel process of this invention may be represented by the following equation:

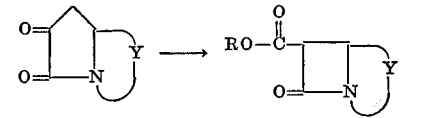

FORMULA I                         FORMULA II wherein Y represents

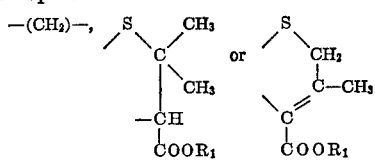

$n$ represents a positive whole integer of from 3 to 4; and R and $R_1$ each represent hydrogen or an easily removable group, for example lower alkyl of from 1 to 4 carbon atoms, straight or branched, such as methyl, ethyl or t-butyl, benzyl, p-methoxybenzyl or trichloroethyl.

Among the novel compounds within the scope of Formula II, preparable by the present process are:

3-carboxy-1,4-tetramethylene-2-azetidinone,
3-carbomethoxy-1,4-tetramethylene-2-azetidinone,
3-carboxy-1,4-trimethylene-2-azetidinone,
3-carbomethoxy-1,4-trimethylene-2-azetidinone,
3-methyl-8-oxo-1-aza-5-thiabicyclo[4.2.0]octa-2-ene-2,7-dicarboxylic acid,
2-carbomethoxy-3-methyl-8-oxo-1-aza-5-thiabicyclo [4.2.0]oct-2-ene-7-carboxylic acid
2-t-butoxycarbonyl-3-methyl-8-oxo-1-aza-5-thiobicyclo [4.2.0]oct-2-ene-7-carboxylic acid,
2-trichloroethoxycarbonyl-3-methyl-8-oxo-1-aza-5-thiobicyclo[4.2.0]oct-2-ene-7-carboxylic acid,
3,3-dimethyl-7-oxo-1-aza-4-thiabicyclo[3.2.0]heptane-2,6-dicarboxylic acid,
2-carbomethoxy-3,3-dimethyl-7-oxo-1-aza-4-thiabicyclo [3.2.0]heptane-6-carboxylic acid and
2-carbobenzoxy-3,3-dimethyl-7-oxo-1-aza-4-thiabicyclo [3.2.0]heptane-6-carboxylic acid.

In accordance with the novel process of this invention as shown above, a cyclic α-ketoamide compound of Formula I is subjected to an oxidizing agent which results in the formation of a carboxylic acid group and ring contraction to α-lactam structure of Formula II. Advantageously the cyclic α-ketoamide is treated with an oxidant such as periodate, lead tetraacetate, bismuthate or iodosobenzene diacetate in an aqueous or aqueous lower alkanol solution, for example aqueous methanol or ethanol solution, in the presence of a buffer such as borate or phosphate alkali metal salt at a temperature of from 0–40° C. for from 6 to 24 hours. Preferably the cyclic α-ketoamide is treated with periodate, for example sodium metaperiodate, in aqueous solution buffered at a pH in the range of 5–9, for example with sodium phosphate, at room temperature, namely 20–30° C. Workup of the reaction mixture by standard procedures, including removal of any excess oxidant, yields the carboxy substituted lactam.

The oxidant employed in this process is of the type which is reactive to a 1,2-glycol system. Thus other similar oxidants such as chromic oxide in pyridine as a solvent may be employed.

When a compound of Formula I where Y is a sulfur containing moiety (as defined above) is employed in this process, sulfoxide formation may occur. In that event the sulfoxide may be reduced in dimethylformamide by acetyl chloride-sodium dithionite followed by chromatographic purification.

The carboxy substituted lactam obtained as described hereinabove (R is hydrogen) may be converted to the corresponding ester derivatives by procedures known in the art. The compounds of Formula II may be obtained either by employing a starting material with the desired $R_1$ substituent or by interchanging the substituents after formation of the products. The ester derivatives are readily cleaved to the free carboxyl group by well known procedures.

The cyclic α-ketoamide starting materials of Formula I are novel compounds and thus are a part of this invention. These compounds are prepared by various procedures depending on the nature of Y. To prepare the compounds where Y is —(CH₂)ₙ—, a lower alkyl ester of 2-piperidylacetic acid or 2-pyrrolidylacetic acid is condensed with a dilower-alkyl ester of oxalic acid to give the 1-carboalkoxy-2,3-dioxooctahydropyrrocoline and pyrrolizidine, respectively, while are decarboxylated, for example by heating in the presence of a mineral acid, to yield the 2,3-dioxo derivatives.

To prepare compounds of formula I where Y is

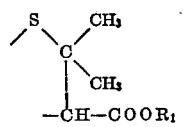

D(—)-penicillamine is treated with a lower alkyl ester of β,β-dialkoxypropionate in the presence of trifluoroacetic acid to give a 2-carboalkoxymethyl-4-carboxy-5-dimethylthiazolidine which is condensed with a dilower alkyl ester of oxalic acid to give the 7-carboalkoxy-3-carboxy-2,2-dimethyl-5,6-dioxopyrrolo[2,1-b]thiazole. The latter is decarboxylated, for example, by heating the presence of a mineral acid, to give the desired 3-carboxy-2,2-dimethyl-5,6-dioxopyrrolo[2,1-b]thiazole which is conveniently converted to the ester derivatives by standard procedures.

Alternatively the 2-carboalkoxymethyl-4-carboxy-5-dimethylthiazolidine is reacted which a lower alkyl ester of oxalyl mono chloride to give a 2-carboalkoxymethyl-3-alkoxyoxalyl-4-carboxy-5,5-dimethylthiazolidine which is heated with an alkali metal lower alkoxide, for example sodium ethoxide, to give the same 7-carboalkoxy-3-carboxy-2,2-dimethyl - 5,6 - dioxopyrrolo[2,1-b]thiazole. Decarboxylation by heating in the presence of a mineral acid similarly yields the 3-carboxy-2,2-dimethyl-5,6-dioxopyrrolo[2,1-b]thiazole.

The dioxopyrrolo[2,1-b]thiazole is also obtained by the condensation of a lower alkyl ester of 2-oxo-4-lower-alkoxy-3-butenoate with D(—)-penicilliamine to give 4-carboxyl-5,5 - dimethyl-2 - loweralkoxyoxalylmethylthiazolidine which is then treated with an alkali metal lower alkoxide followed by decarboxylation with a mineral acid.

The compounds of Formula I where Y is

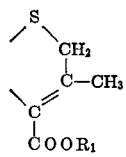

are prepared by condensing a loweralkoxycarbonylthioacetamide with a lower alkyl ester of α-oxo-β-methylene-buytrate in a nonreactive organic solvent such as dioxane, saturated with hydrogen chloride, to give a lower alkyl 4-carboalkoxy-5-methyl-6H-1,3-thiazin-2-yl acetate. The latter is reacted with a lower alkyl ester of oxalyl mono chloride to give a lower alkyl 4-carboalkoxy-3-alkoxyoxalyl-5-methyl-6H-1,3-thiazin-2-yl acetate which is reduced with aluminum amalgam to the corresponding thiazine-2-acetate. This compound is then ring closed by heating with an alkali metal lower alkoxide to give 4,8-dicarboalkoxy-6,7-dioxo-3-methyl - 2H - pyrrolo[2,1-b]thiazine. Decarboxylation with a mineral acid yields 4-carboxy-6,7-dioxo-3-methyl-2H-pyrrolo[2,1-b]thiazine.

Where the above description has been directed to the preparation of compounds of Formula I where $R_1$ is lower alkyl, it is apparent that any of the other ester derivatives may be similarly employed. Further, any of the ester moieties may be cleaved by standard procedures to give the compounds where $R_1$ is hydrogen.

The products prepared in accordance with the process of this invention, the compounds of Formula II, are useful as intermediates to prepare compounds having antimicrobial activity, particularly known penicillin and cephalosporin derivatives. The carboxyl group of the lactam ring in Formula II (with $R_1$ not hydrogen) is converted to an amino group by means of the well known Curtis or Schmidt reactions. The resulting amino compound is then acylated in a conventional manner with either an acyl halide or mixed anhydride to give active penicillins and cephalosporins, and analogs thereof. Corresponding compounds when $R_1$ is hydrogen are conveniently obtained by removal of the ester moiety by standard procedures applied to either the amino or acylamino derivative. The free carboxyl group, $R_1$ is hydrogen, of the penicillin and cephalsoporin products may then be coverted into the usual alkali metal or amine salts.

The foregoing is a general description of the novel process for the preparation of lactams and methods for obtaining the required starting materials. The following examples are intended to illustrate the process and products of the invention and as such are not to be construed as limiting the scope thereof. Temperatures are in degrees centigrade, unless otherwise noted.

EXAMPLE 1

To a solution of 3.34 g. (145 mmol) of sodium in 450 ml. of absolute ethanol is added 18.6 g. (127 mmol) of diethyl oxalate and then, dropwise, 19.9 g. (86.3 mmol) of ethyl 2-piperidylacetate is added. The resulting mixture is refluxed three hours. The precipitate formed is removed by filtration, washed with ether, air dried and poured into cold 10% hydrochloric acid. The colorless crystals that separate are washed with water and air dried to give 1-carbethoxy - 2,3 - dioxoöctahydropyrrocoline, M.P. 116–117°.

To 250 ml. of refluxing 10% hydrochloric acid is added 5.00 g. (22.2 mmol) of 1-carbethoxy-2,3-dioxoöctahydropyrrocoline and the refluxing is continued under nitrogen for 45 minutes. The solution is cooled to room temperature and continuously extracted with methylene chloride for 24 hours. Evaporation of the solvent from the extract gives an amber oil which solidifies under vacuum. Sublimation at 125°, 0.01 mm. gives 2,3-dioxoöctahydropyrrocoline, M.P. 195–200° (decomp.).

A solution of 4.19 g. (19.6 mmol) of sodium metaperiodate in 150 ml. of pH 7.0 sodium phosphate buffer (0.2 M) is stirred and 0.50 g. (3.27 mmol) of 2,3-dioxoöctahydropyrrocoline is added. The resulting solution is stirred in the dark for 23 hours at room temperature. The excess oxidant is destroyed by the addition of 45 ml. of 2 M sodium bisulfite solution. After adjusting the pH to 8 with saturated aqueous potassium carbonate, the solution is extracted with methylene chloride. The pH is then adjusted to 2 with phosphoric acid and the solution is continuously extracted with methylene chloride for 80 hours. The pH 2 extract is evaporated to an oil which crystallizes under vacuum to yield 3-carboxy-1,4-tetramethylene-2-azetidinone, M.P. 145–146° (decomp.).

The above prepared acid (0.46 g., 2.72 mmol) is treated with an ether solution of diazomethane prepared from 10.8 g. (50 mmol) of N-methyl-N-nitroso - p - toluenesulfonamide. Evaporation of the ether and excess diazomethane leaves the product, 3-carbomethoxy-1,4-tetramethylene-2-azetidinone, as an oil which is purified by chromatography.

EXAMPLE 2

3 - carboxy-1,4-tetramethylene-2-azetidinone (850 mg., 5 mmol) is dissolved in 10 ml. of water and neutralized to a phenolphthalein end point with 1 M sodium hydroxide (carbonate free). This solution is lyophilized and the resulting solid residue (sodium salt) is dried in a vacuum desiccator for 48 hours. The dry salt is suspended in benzene, 650 mg. of oxalyl chloride is added with cooling and the mixture warmed slowly to 40° with stirring. Evolution of gas ceases after about 30 minutes at 40°. A suspension of 350 mg. of activated sodium azide in 10 ml. of benzene is added and the mixture is heated at reflux for 12 hours. The cooled reaction mixture is filtered, the filtrate is concentrated in vacuo to about one-third volume, 10 ml. of benzyl alcohol is added and the solution is heated on the steam bath for two hours. Evaporation of the solvent and crystallization from methylcyclohexane gives 3 - benzyloxycarbonylamino-1,4-tetramethylene-2-azetidinone, M.P. 42–45°.

To a solution of 550 mg. (2 mmol) of the above prepared benzyl carbamate in 10 ml. of ethanol is added 0.5 ml. of concentrated hydrochloric acid and then 0.2 g. of 10% palladium on charcoal. The mixture is hydrogenated with shaking on a Parr apparatus for two hours. The catalyst is removed by filtration and the filtrate diluted with ether to yield 3 - amino-1,4-tetramethylene-2-azetidinone hydrochloride.

Treatment of the hydrochloride in ethanol solution with base liberates the free amino compound which can be extracted into ether and isolated.

EXAMPLE 3

To a stirred solution of 1.4 g. (10 mmol) of 3-amino-1,4-tetramethylene-2-azetidinone and 1.68 g. of sodium bicarbonate in 25 ml. of water and 25 ml. of acetone is slowly added 2.3 g. (15 mmol) of phenylacetyl chloride.

The mixture is allowed to attain room temperature and the solution is stirred for an additional one-half hour. The reaction mixture is then extracted with butyl acetate, the extracts washed with water and dried. The dried extract is concentrated to a residue comprising 3-benzylamido-1,4-tetramethylene-2-azetidinone.

EXAMPLE 4

To a solution of 4.20 g. (183 mmol) of sodium in 450 ml. of absolute ethanol is added 23.5 g. (161 mmol) of diethyl oxalate and 23.0 g. (146 mmol) of ethyl 2-pyrrolidinylacetate. The resulting solution is refluxed for four hours and then the solvent is removed under vacuum. The dark residue is dissolved in 90 ml. of 10% hydrochloric acid which yields upon cooling the product, 1-carbethoxy-2,3-dioxopyrrolizidine, M.P. 117–119°.

To 250 ml. of refluxing 10% hydrochloric acid is added 5.0 g. (23.8 mmol) of 1-carbethoxy-2,3-dioxopyrrolizidine and the refluxing is continued under nitrogen for 25 minutes. The solution is cooled to room temperature and continuously extracted with methylene chloride for 24 hours. Evaporation of the methylene chloride gives a solid which is sublimed at 100°/0.01 mm. to yield 2,3-dioxopyrrolizidine.

A solution of 4.19 g. (19.6 mmol) of sodium metaperiodate in 150 ml. of pH 5.5 sodium phosphate buffer (0.2 M) is stirred and 0.45 g. (3.27 mmol) of 2,3-dioxopyrrolizidine is added. The resulting solution is stirred in the dark for 24 hours at room temperature. The excess oxidant is destroyed by treatment with 2 M sodium bisulfite solution. The mixture is then worked up as described in Example 1 to give 3-carboxy - 1,4 - trimethylene - 2-azetidinone.

This acid is esterified with diazomethane in an analogous fashion to the tetramethylene analog to furnish the corresponding 3-carbomethoxy - 1,4 - trimethylene-2-azetidinone.

EXAMPLE 5

A mixture of 26.0 g. (137 mmol) of ethyl β,β-diethoxypropionate, 16.31 g. (110 mmol) of D(—)-penicillamine, 150 ml. of glacial acetic acid, 5.0 ml. of water and 5.5 ml. of trifluoroacetic acid is stirred at room temperature for 187 hours. The solvent is removed in vacuo at 40°, the residue is dissolved in saturated sodium bicarbonate and the resulting solution continually extracted with methylene chloride for 46 hours. The aqueous solution is then adjusted to pH 3.5–4.0 with concentrated phosphoric acid and 15 g. of sodium orthophosphate (NaH$_2$PO$_4$) is added. After continuous extraction with methylene chloride for 30 hours, removal of the solvent in vacuo and drying at 40° under vacuum gives 2-carbethoxymethyl-4-carboxy-5,5 - dimethylthiazolidine, M.P. 145–147°.

Alternatively, a mixture of 7.5 mmol of ethyl β,β-diethoxypropionate, 746 mg. (5 mmol) of D(—)-penicillamine, 6.3 ml. of 1 N hydrochloric acid and 6 ml. of tetrahydrofuran is stirred at room temperature for 24 hours. The solvent is removed in vacuo and the residue dissolved in saturated sodium bicarbonate. After extracting with methylene chloride, the pH is adjusted to 3.5–4 with concentrated phosphoric acid and extracted with methylene chloride. The solvent is removed in vacuo from the dried extract, the residue is dissolved in a small volume of methylene chloride and then treated with methylcyclohexane to precipitate the product 2-carbethoxymethyl-4-carboxy-5,5-dimethylthiazolidine, identical to the material prepared above.

To 1.85 g. (7.5 mmol) of 2-carbethoxymethyl-4-carboxy-5,5-dimethylthiazolidine is added 4.34 g. (30 mmol) of diethyl oxalate, then 16 ml. of 1 N sodium ethoxide in ethanol and the mixture is refluxed for one hour. The ethanol is removed by vacuum distillation and the residue dissolved in water to give a basic solution. After extracting with methylene chloride, the pH is adjusted to 2 with concentrated phosphoric acid. Extraction with methylene chloride, drying and solvent removal in vacuo gives 7-carbethoxy-3-carboxy - 2,2 - dimethyl-5,6-dioxopyrrolo[2,1-b]thiazole, M.P. 43–50°.

A mixture of 3.01 g. (10 mmol) of the above pyrrolothiazole and 100 ml. of 10% hydrochloric acid is refluxed under nitrogen for 100 minutes. After cooling the solution is continuously extracted with methylene chloride for 24 hours. Removal of the solvent yields 3-carboxy-2,2-dimethyl-5,6-dioxopyrrolo[2,1-b]thiazole.

The addition of one equivalent of diazomethane in ether to the above acid (660 mg.) in methylene chloride gives, after removal of the solvent in vacuo, 3-carbomethoxy-2,2-dimethyl-5,6-dioxopyrrolo[2,1-b]thiazole.

A solution of 4.19 g. (19.6 mmol) of sodium metaperiodate in 150 ml. of pH 7.0 sodium phosphate buffer (0.2 M) is stirred and 0.8 g. (3.27 mmol) of 3-carbomethoxy-2,2-dimethyl-5,6-dioxopyrrolo[2,1-b]thiazole is added. The resulting solution is stirred in the dark for 23 hours at room temperature. The excess oxidant is destroyed with sodium bisulfite solution and the mixture is worked up as described in Example 1 to yield 2-carbomethoxy - 6 - carboxy - 3,3-dimethyl-7-oxo-4-thia-1-azabicyclo[3.2.0]heptane.

Treatment of this carboxylic acid as described in Example 2 to form the acid azide followed by conversion to the benzyl carbamate and subsequent reduction furnishes methyl 6-aminopencillanate.

EXAMPLE 6

A mixture of 4.15 g. (16.8 mmol) of 2-carbethoxymethyl-4-carboxy-5,5-dimethylthiazolidine and 50 ml. of anhydrous methylene chloride is cooled to —70° and 4.04 g. (51 mmol) of anhydrous pyridine is added. After stirring at —70° for 30 minutes, 4.1 ml. (35.6 mmol) of ethyloxalyl chloride is added slowly. The resulting mixture is stirred at —70° for one hour and at 0° for one-half hour. The solvent is removed in vacuo, 30 g. of ice and 50 ml. of saturated sodium bicarbonate solution are added. After stirring at room temperature and pH 8 for five hours, the aqueous solution is extracted with methylene chloride. The dried extract is evaporated and the residue is purified to give 2-carbethoxymethyl-3-ethoxyoxalyl-4-carboxy-5,5-dimethylthiazolidine.

To 7.5 mmol of 2-carbethoxymethyl-3-ethoxyoxalyl-4-carboxy-5,5-dimethylthiazolidine is added 16 ml. of 1 N sodium ethoxide in ethanol and the mixture is refluxed for one hour. The ethanol is removed in vacuo and the residue dissolved in water. This solution is extracted with methylene chloride, adjusted to pH 2 with concentrated phosphoric acid and extracted with methylene chloride. The dried extract is evaporated to yield 7-carbethoxy-3-carboxy-2,2-dimethyl - 5,6 - dioxopyrrolo[2,1-b]thiazole, identical to the material prepared in Example 5.

A solution of 10 mmol of the above prepared pyrrolothiazole and 100 ml. of 10% hydrochloric acid is refluxed under nitrogen for one and one-half hours. After cooling, the reaction mixture is continuously extracted with methylene chloride for 24 hours. Removal of the solvent gives the product, 3-carboxy-2,2-dimethyl-5,6-dioxopyrrolo[2,1-b]thiazole which is identical to the material prepared in Example 5.

EXAMPLE 7

A mixture of 34.8 g. (0.3 m.) of ethyl pyruvate, 75 g. (0.525 m.) of triethylorthoformate and 75 g. (0.75 m.) of acetic anhydride is heated at reflux under nitrogen for two hours. Distillation gives ethyl 2-oxo-4-ethoxy-3-butenoate, B.P. 79°/0.5 mm.

Following the procedure of Example 5, a mixture of 137 mmol of the above prepared butenoate and 110 mmol of D(—)-penicillamine in glacial acetic acid and trifluoroacetic acid is stirred at room temperature to give upon similar workup 4-carboxy-5,5-dimethyl-2-ethoxyoxalylmethylthiazolidine.

To 7.5 mmol of 4-carboxy-5,5-dimethyl-2-ethoxyoxalyl-methylthiazolidine is added 16 ml. of 1 N sodium ethoxide in ethanol and the mixture is refluxed for one hour. Workup of the reaction mixture as described in Example 6 gives the same 7-carbethoxy-3-carboxy-2,2-dimethyl-5,6-dioxopyrrolo[2,1-b]thiazole.

A solution of 10 mmol of the pyrrolothiazole and 100 ml. of 10% hydrochloric acid is refluxed under nitrogen for one and one-half hours. After cooling, the reaction mixture is continuously extracted with methylene chloride for 24 hours. Removal of the solvent yields 3-carboxy-2,2-dimethyl-5,6-dioxopyrrolo[2,1-b]thiazole, identical to the material prepared in Example 5.

EXAMPLE 8

A solution of 10.6 g. (80.0 mmol) of methoxycarbonyl-thioacetamide (freshly recrystallized) and 10.2 g. (80.0 mmol) of methyl α-oxo-β-methylenebutyrate in 50 ml. of dioxane which has previously been saturated with hydrogen chloride at ice bath temperature is held at 15° for 24 hours. Removal of the solvent leaves as oil which is chromatographed on silica gel using chloroform as an eluant to give after recrystallization from hexane, methyl 4-carbomethoxy-5-methyl-6H-1,3-thiazin-2-yl acetate.

To a 5% solution of the above thiazine in dimethoxy-ethane containing 150 mole percent of triethylamine is added 100 mole percent of methyl oxalyl chloride in dimethoxyethane. After four hours at room temperature, water and chloroform are added and the chloroform layer is washed with another portion of water then dried and evaporated. The residue is chromatographed on silica gel, eluting with chloroform-hexane to give methyl 4-carbomethoxy-3-methoxyoxalyl - 5 - methyl-6H-1,3-thiazin-2-yl acetate, M.P. 115–118°.

To a solution of 329 mg. (1.00 mmol) of the above thiazinyl acetate in 50 ml. of 5% aqueous dioxane is added in small pieces the aluminum amalgam prepared from 500 mg. of aluminum foil. The progress of the reaction is followed by monitoring the ultraviolet absorption. Additional aluminum amalgam is used as necessary. After about 22 hours the reaction mixture is filtered and the filtrate lyophilized to yield an oil. The oil is dissolved in ether and dry hydrogen chloride is bubbled into the solution for about 10 minutes. The supernatant is decanted, washed with water followed by 1 N sodium bicarbonate solution, dried and evaporated to give methyl 4-carbomethoxy - 3 - methoxyoxalyl - 5- methyl - 6H - 1,3 - thiazine-2-acetate.

A mixture of 7.5 mmol of methyl 4-carbomethoxy-3-methoxyoxalyl - 5 - methyl - 6H - 1,3 - thiazine - 2 - acetate and 16 ml. of 1 N sodium ethoxide in ethanol is refluxed for one hour. Workup of the reaction mixture as described in Example 6 yields 4,8-dicarbomethoxy-6,7-dioxo-3-methyl-2H-pyrrolo[2,1-b]thiazine.

A solution of 10 mmol of the above prepared pyrrolothiazine and 100 ml. of 10% hydrochloric acid is refluxed under nitrogen for one and one-half hours. After cooling, the reaction mixture is continuously extracted with methylene chloride the benzyl carbamate and subsequent reduction gives 4-carboxy-6,7-dioxo-3-methyl-2H-pyrrolo[2,1-b]thiazine.

The addition of one equivalent of diazomethane in ether to the above acid in methylene chloride gives 4-carbomethoxy-6,7-dioxo-3-methyl-2H-pyrrolo[2,1-b]thiazine.

To a stirred solution of 4.19 g. (19.6 mmol) of sodium metaperiodate in 150 ml. of pH 7.0 sodium phosphate buffer (0.2 M) is added 0.78 g. (3.27 mmol) of 4-carbomethoxy - 6,7 - dioxo - 3 - methyl - 2H - pyrrolo[2,1-b] thiazine. The resulting mixture is stirred in the dark for 24 hours at room temperature. The excess oxidant is destroyed with sodium bisulfite solution and the mixture is worked up as described in Example 1 to yield 2-carbomethoxy - 7 - carboxy - 3 - methyl - 8 - oxo - 5 - thia - 1-azabicyclo[4.2.0]oct-2 ene.

Treatment of this carboxylic acid as described in Example 2 to form the acid azide followed by conversion to the benzyl carbamate and subsequent reduction gives methyl 7-aminodecephalosporanate.

What is claimed is:
1. A compound of the formula

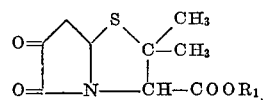

where $R_1$ is hydrogen, lower alkyl of from 1 to 4 carbon atoms, benzyl, p-methoxybenzyl, or trichloroethyl.

2. A compound according to claim 1 in which $R_1$ is hydrogen, being the compound 3-carboxy-2,2-dimethyl-5,6-dioxopyrrolo[2,1-b]thiazole.

3. A compound according to claim 1 in which $R_1$ is methyl, being the compound 3-carbomethoxy-2,2-dimethyl-5,6-dioxopyrrolo[2,1-b]thiazole.

References Cited
UNITED STATES PATENTS 3,714,156   1/1973   Rapoport _____ 260—306.7

RICHARD J. GALLAGHER, Primary Examiner